E. M. MOORE AND O. V. PEET.
TIRE REPAIR.
APPLICATION FILED JAN. 9, 1922.
1,426,897.
Patented Aug. 22, 1922.
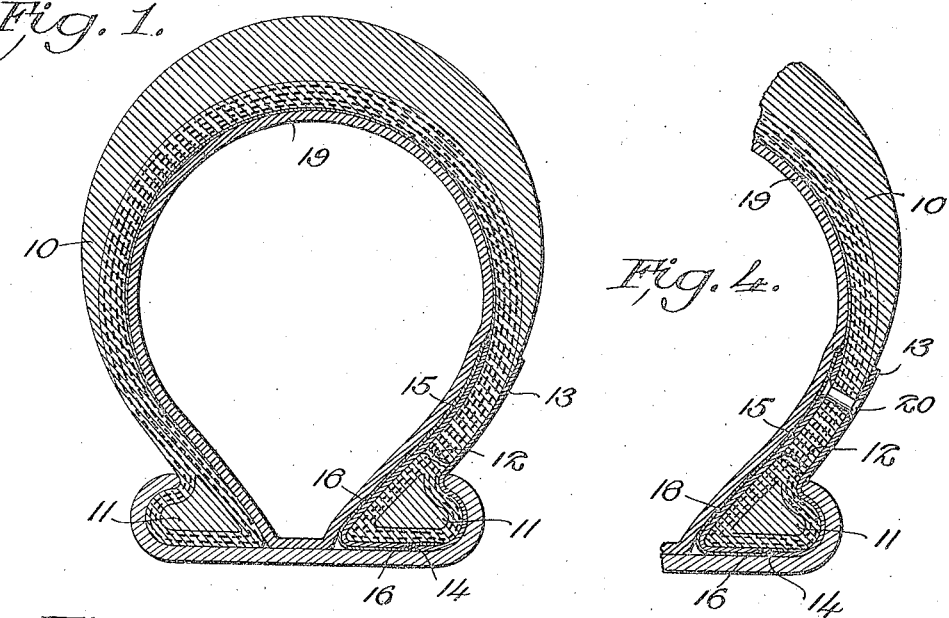
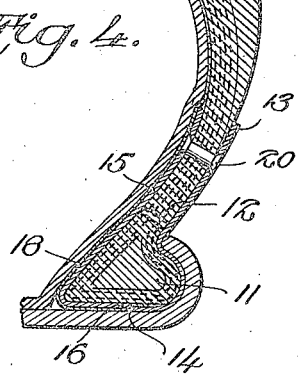
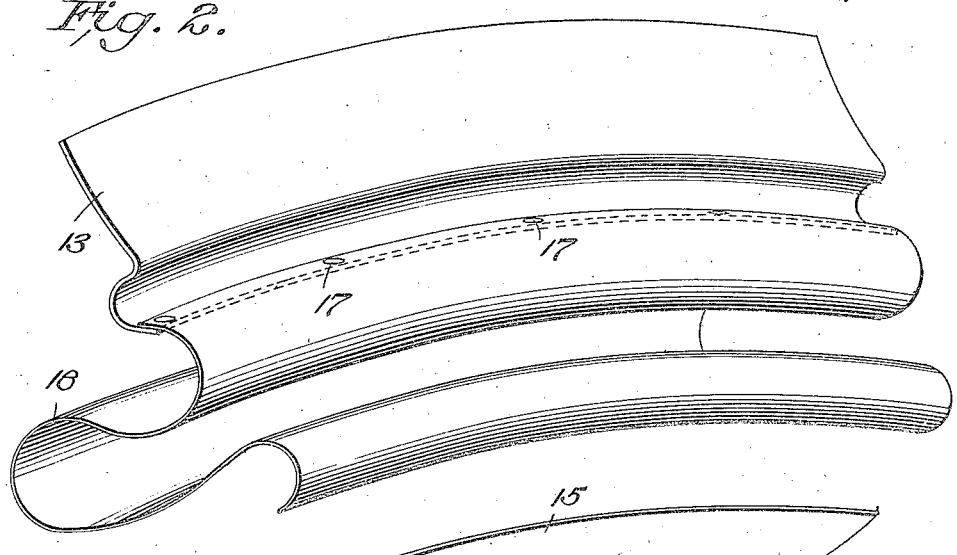
Inventors
Edward M. Moore,
Owen V. Peet,
By Bright and Bailey
Attorneys

UNITED STATES PATENT OFFICE.

EDWARD M. MOORE AND OWEN V. PEET, OF INDIANAPOLIS, INDIANA.

TIRE REPAIR.

1,426,897.  Specification of Letters Patent.  Patented Aug. 22, 1922.

Application filed January 9, 1922. Serial No. 528,071.

*To all whom it may concern:*

Be it known that we, EDWARD M. MOORE and OWEN V. PEET, citizens of the United States, and residents of Indianapolis, in the county of Marion and State of Indiana, have invented certain new and useful Improvements in Tire Repairs, of which the following is a specification.

Our invention relates to a tire repair of the general type wherein metallic plates are utilized to reinforce a tire casing over an injured area.

In developing our invention it has been our purpose to provide a tire repair of this type which has a wide range of application, in that it can be utilized effectively to repair a tire, irrespective of whether the injury to the casing is a bead cover separation, a rut cut, a rim cut, or a rim blowout; which is not fixedly attached to the injured tire and therefore can be readily removed from one tire and utilized in connection with another, thus rendering the life and usefulness of our repair substantially indefinite; which can be produced and sold as a stock accessory capable of application to all standard makes of tires, irrespective of their variations in size and form; which can be applied at any place or under any conditions by an unskilled workman without the use of special tools or any practical knowledge of tire repair; which is free to adjust itself to any particular tire in response to gradual increase in air pressure in the inner tube when the latter is being inflated; which is automatically held in desired assembly with a tire casing through the medium of the air pressure of the inner tube, which greatly simplifies its application to the tire and the subsequent application of the tire to the wheel; which fully protects the inner tube against contact with metal; which may be applied and removed with ease and facility; and which possesses other advantages as will hereinafter appear.

While one appropriate form of carrying our invention into practice is illustrated and described, it will be distinctly understood that various changes in forms and proportions may be resorted to with the exercise of only ordinary mechanical skill and without departing from the scope of our invention as set forth in the appended claims.

In the drawings chosen to illustrate our invention

Figure 1 is a transverse section of a tire mounted on a rim and showing our invention applied to repair a rim blowout;

Figure 2, a perspective view of the outer metallic member of our repair with its associated fabric apron;

Figure 3, a perspective view of the inner metallic member of our repair; and

Figure 4, a fragmental sectional view showing our invention used as a permanent repair.

In the drawings 10 indicates a tire casing including the usual beads 11 and having a rim blowout injury 12, which latter is shown repaired through the medium of our invention.

Our improved tire repair is shown in Figures 2 and 3 as comprising an outer reinforcing metallic plate 13 sufficiently extensive to more than overlie the area of the rim blowout 12. The plate 13 conforms substantially to the contour of the outer face of the tire and envelops the bead 11 to a point 14 which lies slightly outward of the center of the base of the bead. By reason of the fact that the plate 13 is formed of relatively thin sheet metal it can be easily adjusted to the slight differences in the shapes of the various makes of tires without requiring the use of any special tools or any special skill on the part of the workman. Our improved tire repair further embodies an inner metallic reinforcing plate 15 substantially coextensive with the plate 13 and adapted to envelop the inner side of the bead, said inner plate extending over the base of the bead to a point 16 disposed slightly inwardly of the center of the bead base. Like the plate 13 the plate 15 can be easily adjusted by an unskilled workman to conform to the slight differences in the shape of the various makes of tires. Secured to the inner side of the plate 13 by rivets 17 is a fabric apron 18 sufficiently extensive to overlie the inner face of the tire to substantially the upper end of the bead 11 opposite the rim blowout 12. The purposes of this apron will presently appear.

The manner of applying our improved tire repair is clearly shown in Figure 1. The plates 13 and 15 are positioned against the outer and inner faces of the tire casing 10 respectively so as to fully cover the rim blowout 12. The apron 18 is then passed over the entire outer face of the plate 15 and over the inner face of the tire casing to the full extent of the apron. With the parts in such assembled relation with the tire case an inner tube 19 is inserted and inflated, the apron serving to effectively hold the plate 15 in position until sufficient air can be placed in the tube. When the tube 19 is partly inflated it exerts sufficient pressure to positively hold plate 15 and apron 18 in proper position. The tire is then placed on a rim which latter holds the plate 13 firmly in place. Upon further inflation of tube 19 after application to a rim, the air pressure forces plate 15 outwardly against side wall of the casing which in turn forces plate 13 tightly into bead cavity of the rim. It will be observed that the apron 18, in addition to the functions heretofore ascribed to it, also serves to prevent inner tube 19 from frictioning on the edges of the inner plate 15.

If it is desired to render the repair permanent, it can be accomplished by simply passing rivets 20 through plate 15, tire 10, and plate 13 as shown in Figure 4, the inside head of the rivets being covered by the apron 18.

We claim:—

1. A tire casing repair comprising inner and outer plates adapted respectively to lie against the inner and outer faces of a tire casing, and a fabric apron carried by the outer plate and adapted to be disposed in covering relation to the inner plate.

2. A tire casing repair comprising inner and outer plates adapted respectively to lie against the inner and outer faces of a tire casing, and a fabric apron carried by the outer plate and adapted to be disposed in covering relation to the inner plate and in covering relation to a portion of the inner face of the tire casing.

3. A tire casing repair comprising inner and outer plates adapted respectively to lie against the inner and outer faces of a tire casing and to envelop the inner and outer portions of a tire casing bead, and a fabric apron secured to the outer plate and adapted to be disposed in covering relation to the inner plate.

4. A tire casing repair comprising inner and outer plates adapted respectively to lie against the inner and outer faces of a tire casing and to envelop the inner and outer portions of a tire casing bead with their edges which overlie the base of the bead in spaced relation whereby the plates are free to adjust relatively toward each other, and a fabric apron secured to the outer plate and adapted to be disposed in covering relation to the inner plate.

5. A tire casing repair comprising inner and outer plates adapted respectively to lie against the inner and outer faces of a tire casing and to envelop the inner and outer portions of a tire casing bead, and a fabric apron secured to the outer plate and adapted to be disposed in covering relation to the inner plate and in covering relation to a portion of the inner face of the tire casing.

In testimony whereof we hereunto affix our signatures.

EDWARD M. MOORE.
OWEN V. PEET